United States Patent
Walker et al.

(10) Patent No.: US 7,678,849 B2
(45) Date of Patent: Mar. 16, 2010

(54) HIGH CHROMA HALS STABILIZED POLYMER COMPOSITION

(75) Inventors: Eric Walker, Dublin, OH (US); Jim Ryan, Columbus, OH (US); Elie Merheb, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 551 days.

(21) Appl. No.: 11/092,886

(22) Filed: Mar. 29, 2005

(65) Prior Publication Data

US 2006/0223922 A1    Oct. 5, 2006

(51) Int. Cl.
*C08K 5/00* (2006.01)
*C08K 5/3435* (2006.01)

(52) U.S. Cl. .............. 524/91; 524/99; 524/291

(58) Field of Classification Search .......... 524/100, 524/99, 91, 291
See application file for complete search history.

(56) References Cited

U.S. PATENT DOCUMENTS

| | | | |
|---|---|---|---|
| 5,037,680 A | 8/1991 | Papendick et al. | |
| 5,096,948 A * | 3/1992 | Kurumada et al. | 524/91 |
| 5,492,564 A | 2/1996 | Wooden et al. | |
| 6,017,989 A | 1/2000 | Malm et al. | |
| 6,294,009 B1 | 9/2001 | Letschert et al. | |
| 6,403,721 B1 | 6/2002 | Ding et al. | |
| 6,420,472 B1 | 7/2002 | Rehfuss et al. | |
| 6,492,521 B2 * | 12/2002 | Sassi et al. | 546/188 |
| 6,533,857 B1 | 3/2003 | Schmid et al. | |
| 6,589,661 B2 | 7/2003 | Neely, Jr. | |
| 6,660,797 B1 * | 12/2003 | Banno et al. | 524/505 |
| 6,861,495 B2 | 3/2005 | Barsotti et al. | |
| 7,419,513 B2 * | 9/2008 | Wood et al. | 44/275 |
| 2003/0109609 A1 * | 6/2003 | Lazzari et al. | 524/104 |

FOREIGN PATENT DOCUMENTS

| | | |
|---|---|---|
| EP | 0 437 096 A2 | 7/1991 |
| EP | 0 953 595 A1 | 11/1999 |
| EP | 0 953 602 A1 | 11/1999 |
| JP | 09 003295 A | 1/1997 |
| JP | 09 003298 A | 1/1997 |
| WO | WO 01/62739 A2 | 8/2001 |

OTHER PUBLICATIONS

Sigma-Aldrich description for CAS No. 25973-55-1 printed from www.sigma-aldrich.com.*

* cited by examiner

*Primary Examiner*—Peter D Mulcahy
(74) *Attorney, Agent, or Firm*—Capitol City TechLaw, PLLC; Mark E. Duell

(57) ABSTRACT

High chroma colored thermoplastic polyolefin compositions having enhanced weatherability are disclosed. The compositions incorporate ultraviolet light absorbers and hindered amine light stabilizers.

20 Claims, 1 Drawing Sheet

HIGH CHROMA HALS STABILIZED POLYMER COMPOSITION

BACKGROUND

1. Field of the Invention

This invention relates to high chroma polyolefin compositions stabilized by the incorporation of a hindered amine light stabilizer.

2. Discussion of the Related Art

Various exterior components of automotive vehicles can be made from lightweight durable plastic materials, such as thermoplastic polyolefin-based mixtures. The component can be painted, or can have colorants mixed or blended into the plastic mixture itself. A concern with painted components is the adhesion of the paint to the surface of the plastic component. While concerns about paint adhesion are not present with plastic mixtures that incorporate the colorants, there are concerns about the degradation and durability of the colorants due to exposure to environmental extremes in temperature, humidity, stress, and light, especially ultraviolet radiation.

It is known to incorporate UV absorbers or screeners, along with other light stabilizers into plastic mixtures. One category of known light stabilizer is the hindered amine light stabilizer (hereinafter "HALS"). Plastic mixtures must be carefully formulated in order to meet structural requirements, to meet weight requirements, to maintain color characteristics, to prevent "bloom" or haze from forming, to meet cost objectives, and to meet these various objectives over the lifetime of the product into which a component made from the plastic mixture is incorporated.

Many thermoplastic components utilized for automotive exterior applications are muted in color intensity, or chroma value. Black and gray bumpers, claddings, grilles, and skid garnishes are typical automotive exterior applications for low chroma thermoplastics.

Trends in automotive vehicle design utilize more intense color palettes for both exterior and interior components. A need exists for higher color saturation or chroma thermoplastic compositions which can meet rigorous physical and chemical demands for weatherability and color longevity required for the automotive applications.

SUMMARY OF THE INVENTION

The present teachings meet the needs for high chroma thermoplastic compositions with enhanced color stability and weatherability under conditions typically experienced in automotive exterior applications.

The present teachings provide a composition including about 58 to about 66 wt. % polypropylene, about 26 to about 31 wt. % rubber, about 6.5 to about 10.5 wt. % talc, about 0.5 to about 3 wt. % colorant, about 0.1 to about 0.8 wt. % ultraviolet light absorber, and about 0.2 to about 0.9 wt. % hindered amine light stabilizer. The chroma value of the composition being between about 3 and about 25.

Also provided by the present teachings is a composition comprising about 58 to about 66 wt. % polypropylene, about 26 to about 31 wt. % rubber, about 6.5 to about 10.5 wt. % talc, about 0.5 to about 3 wt. % colorant, about 0.1 to about 0.8 wt. % 2-(2H-benzotriazol-2-yl)-4,6-di-t-pentylphenol; and about 0.2 to about 0.9 wt. % of a mixture of 2,2,6,6-tetramethyl-4-piperidylstearate and a hexadecyl ester of 3,5-di-t-butyl-4-hydroxybenzoic acid. The composition having a chroma value of between about 3 and about 25.

The present teachings also provide a method of enhancing the weatherability of high chroma thermoplastic polyolefin compositions by incorporating about 0.1 to about 0.8 wt. % 2-(2H-benzotriazol-2-yl)-4,6-di-t-pentylphenol, and about 0.2 to about 0.9 wt. % of a mixture of 2,2,6,6-tetramethyl-4-piperidylstearate and a hexadecyl ester of 3,5-di-t-butyl-4-hydroxybenzoic acid into a high chroma thermoplastic polyolefin composition, wherein the high chroma thermoplastic polyolefin composition has a chroma value ranging from between about 3 and about 25.

DESCRIPTION OF THE DRAWINGS

The accompanying drawings, which are included to provide a further understanding of the present teachings and are incorporated in and constitute a part of this specification, illustrate various embodiments of the present teachings and together with the detailed description serve to explain the principles of the present teachings. In the drawings.

DETAILED DESCRIPTION

Figure 1:
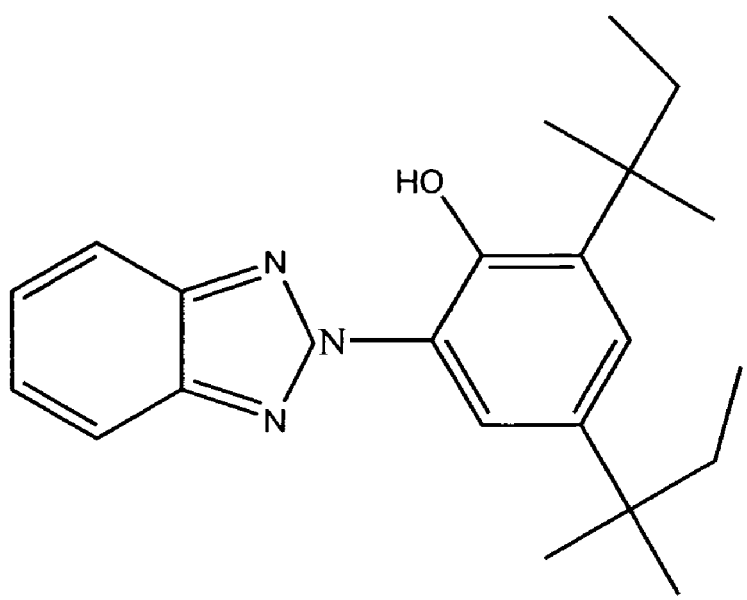
FIG. 1 illustrates the chemical structure of a suitable ultraviolet light absorber, 2-(2H-benzotriazol-2-yl)-4,6-di-t-pentylphenol.

The present teachings relate to compositions of high chroma thermoplastic polyolefins with enhanced color stability and weatherability under conditions typically experienced in automotive exterior applications. The enhanced color stability and weatherability is achieved by, at least, the incorporation of suitable ultraviolet light absorbers, hindered amine light stabilizers, and hindered benzoate light absorbers into the high chroma thermoplastic polyolefin compositions.

The CIELAB (Commission Internationale de l'Eclairage) color space system, well known to those of skill in the art, utilizes a Cartesian coordinate system to describe the color properties of an article. Hue angles (a and b), and luminance, or "lightness", (L*) define the color space. The derived value, "chroma" ($C^*_{ab}$), equal to the square root of $a^{*2}$ plus $b^{*2}$, is roughly equivalent to color saturation or intensity.

In typical low chroma, less than about 3 chroma, thermoplastic compositions, deterioration due to UV radiation can be prevented or minimized by the addition of various additives and mixtures thereof including carbon black, white pigments, other pigments that absorb and/or reflect UV radiation, and organic UV stabilizers, such as, hydroxybenzophenones, hydroxyphenylbenzotriazoles, alpha-cyanoacrylates, oxanilides, salicylates, and hindered amines.

According to various embodiments of the present teachings, the composition can include a ultraviolet light absorber and a hindered amine light stabilizer. As used herein, "hindered amine light stabilizer" can refer both to a hindered amine light stabilizer only, and to a mixture of a hindered amine light stabilizer and a hindered benzoate light stabilizer. According to various embodiments of the present teachings, the mixture of a hindered amine light stabilizer and a hindered benzoate light stabilizer can be a mixture of a relatively low molecular weight hindered amine light stabilizer, for instance, about 400 g/mol, and a higher molecular weight hindered benzoate light stabilizer, for instance, about 475 g/mol.

According to various embodiments of the present teachings, in high chroma, greater than about 3 chroma, thermoplastic compositions, in order to maintain the high chroma value during exposure to UV radiation, the ultraviolet light absorber needs to have an increased radical trapping efficiency without impacting negatively the physical properties of the thermoplastic composition. Physical properties that can be affected by the formulation and the concentration of the ultraviolet light absorber and the hindered amine light stabilizer include, for instance, impact strength, weatherability, and long term heat stability.

According to various embodiments of the present teachings, a composition including about 58 to about 66 wt. % polypropylene, about 26 to about 31 wt. % rubber, about 6.5 to about 10.5 wt. % talc, about 0.5 to about 3 wt. % colorant, about 0.1 to about 0.8 wt. % ultraviolet light absorber, and about 0.2 to about 0.9 wt. % hindered amine light stabilizer is provided. The chroma value of the composition can be between about 3 and about 25.

According to the present teachings, the rubber component can include at least one element selected from the group consisting of polybutadiene, styrene-butadiene copolymer, acrylonitrile-butadiene copolymer, polyisoprene, ethylene-propylene diene terpolymer, ethylene-butene, and ethylene-propylene random copolymer.

The present composition can include a colorant which can be at least one element selected from the group consisting of carbon black, cobalt blue, napthol red, benzimidazole, ultramarine blue, titanium dioxide, phthalocyanine greens, phthalocyanine blues, ferrous/ferric oxide, ferric oxide, isoindolinones, dioxazines, bisdioxazines, and quinacridones. Metallic flake can also be incorporated into the present composition. The colorants can be added to the composition in amounts ranging between about 0.5 wt. % to about 3 wt. %, or in amounts ranging between about 1.4 wt. % to about 1.9 wt. %, based on the overall weight of the composition.

The ultraviolet light absorber utilized in the present composition can be one or more element selected from the group consisting of 2-hydroxy-4-n-octoxybenzophenone, 2,2'-dihydroxy-4-methoxybenzophenone, poly-4-(2-acryloxy-ethoxy)-2-hydroxybenzophenone, [2,2'-thiobis(4-t-octylphenolate)]-n-butylamine nickel(II), 2,2'-(1,4-phenylene) bis[4H-3,1-benzoxazin-4-one], 2-(2'-hydroxy-5'-octylphenyl)-benzotriazole, 2-(2'-hydroxy-3', 5'-di-t-amylphenyl) benzotriazole, 2,4-bis(2,4-dimethylphenyl)-6-(2-hydroxy-4-iso -octyloxyphenyl)-s-triazine, 2-[4-[(2-hydroxy-3-(2'-ethyl)hexyl)oxy]-2-hydroxyphenyl]-4,6-bis(2,4-dimethylphenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, an hydroxyphenylbenzotriazole, 2-(2H-benzotriazol-2-yl)-4,6-di-t -pentylphenol, and a hexadecyl ester of 3,5-di-t-butyl-4-hydroxybenzoic acid. A particularly suitable ultraviolet light absorber can be 2-(2H-benzotriazol-2-yl)-4,6-di-t-pentylphenol. The ultraviolet light absorber can be present in an amount ranging from between about 0.1 wt. % to about 0.8 wt. %, or from between about 0.1 wt. % to about 0.4 wt. %, or from between about 0.4 wt. % to about 0.8 wt. %.

Figure 2:
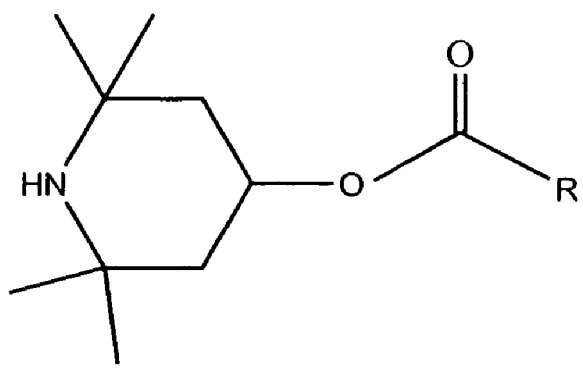
FIG. 2 illustrates the chemical structure of a suitable hindered amine light stabilizer, when R is equal to $C_{16}$, the structure is 2,2,6,6-tetramethyl-4-piperidylstearate.
Figure 3:
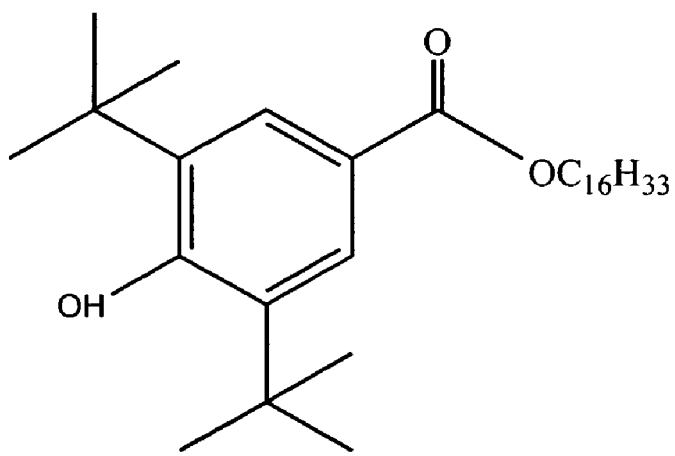
FIG. 3 illustrates the chemical structure of a suitable hindered benzoate light absorber, a hexadecyl ester of 3,5-di-t-butyl-4-hydroxybenzoic acid.

Hindered amine light stabilizers can also be incorporated into the present composition. Suitable hindered amine light stabilizer include, for example, one or more element selected from the group consisting of poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]), poly[(6-morpholino-s-triazine-2,4-diyl) [2,2,6,6-tetramethyl-4-piperidyl)imino]-hexamethylene-[(2, 2,6,6-tetramethyl-4-piperidyl)imino]], bis(2,2,6,6-tetramethyl-4-piperidyl)sebacate, bis( 1,2,2,6,6-pentamethyl-4-piperidyl)sebacate, methyl 1,2,2,6,6-pentamethyl-4-piperidyl sebacate, 2,2,6,6-tetramethyl-4-piperidyl stearate, and 3-dodecyl-l-(2,2,6,6-tetramethyl-4-piperidyl)-pyrrolidin-2,5-dione. A particularly suitable hindered amine light stabilizer can be a mixture of 2,2,6,6-tetramethyl-4-piperidylstearate and a hexadecyl ester of 3,5-di-t-butyl-4-hydroxybenzoic acid. With respect to FIG. 2, the R group of the 2,2,6,6-tetramethyl-4-piperidyl-based structure can vary between $C_{11}$ and $C_{20}$, with $C_{16}$ providing the stearate formulation.

The hindered amine stabilizer can be present in the present composition in an amount ranging from between about 0.2 wt. % to about 0.9 wt. %, or from between about 0.2 wt. % to about 0.6 wt. %, or from between about 0.5 wt. % to about 0.9 wt. %.

According to various embodiments of the present teachings, the present composition can have a chroma value of between about 3 and about 25, or from between about 7 and about 15, or from between about 9 and about 13.

According to various embodiments of the present teachings, a composition comprising about 58 to about 66 wt. % polypropylene, about 26 to about 31 wt. % rubber, about 6.5 to about 10.5 wt. % talc, about 0.5 to about 3 wt. % colorant, about 0.1 to about 0.8 wt. % 2-(2H-benzotriazol-2-yl)-4,6-di-t-pentylphenol; and about 0.2 to about 0.9 wt. % of a mixture of 2,2,6,6-tetramethyl-4-piperidylstearate and a hexadecyl ester of 3,5-di-t-butyl-4-hydroxybenzoic acid is also provided. The composition having a chroma value of between about 3 and about 25.

According to the present teachings, the rubber component can include at least one element selected from the group consisting of polybutadiene, styrene-butadiene copolymer, acrylonitrile-butadiene copolymer, polyisoprene, ethylene-propylene diene terpolymer, ethylene-butene, and ethylene-propylene random copolymer.

The present composition can include a colorant which can comprise at least one element selected from the group consisting of carbon black, cobalt blue, napthol red, benzimidazole, ultramarine blue, titanium dioxide, phthalocyanine greens, phthalocyanine blues, ferrous/ferric oxide, ferric oxide, isoindolinones, dioxazines, bisdioxazines, and quinacridones. Metallic flake can also be incorporated into the present composition. The colorants can be added to the composition in amounts ranging between about 0.5 wt. % to about 3 wt. %, or in amounts ranging between about 1.4 wt. % to about 1.9 wt. %, based on the overall weight of the composition.

The 2-(2H-benzotriazol-2-yl)-4,6-di-t-pentylphenol can be present in an amount ranging from between about 0.1 wt. % to about 0.8 wt. %, or from between about 0.1 wt. % to about 0.4 wt. %, or from between about 0.4 wt. % to about 0.8 wt. %.

The mixture of 2,2,6,6-tetramethyl-4-piperidylstearate and a hexadecyl ester of 3,5-di-t-butyl-4-hydroxybenzoic acid can be present in an amount ranging from between about 0.2 wt. % to about 0.9 wt. %, or from between about 0.2 wt. % to about 0.6 wt. %, or from between about 0.5 wt. % to about 0.9 wt. %.

According to various embodiments of the present teachings, the present composition can include, in one embodiment, about 0.2 wt. % 2-(2H-benzotriazol -2-yl)-4,6-di-t-pentylphenol and about 0.4 wt. % of a mixture of 2,2,6,6-tetramethyl-4-piperidylstearate and a hexadecyl ester of 3,5-di-t-butyl-4-hydroxybenzoic acid, and in another embodiment, about 0.6 wt. % 2-(2H-benzotriazol-2-yl)-4,6-di-t-pentylphenol and about 0.7 wt. % of a mixture of 2,2,6,6-tetramethyl-4-piperidylstearate and a hexadecyl ester of 3,5-di-t-butyl-4-hydroxybenzoic acid. Concentration of the ultraviolet light absorbers and hindered amine light stabilizers can be varied to obtain optimized performance.

According to various embodiments of the present teachings, the present composition can have a chroma value of between about 3 and about 25, or between about 7 and about 15, or between about 9 and about 13.

The present teachings also provide a method of increasing the weatherability of a high chroma thermoplastic polyolefin composition by incorporating about 0.1 to about 0.8 wt. % 2-(2H-benzotriazol-2-yl)-4,6-di-t-pentylphenol, and about 0.2 to about 0.9 wt. % of a mixture of 2,2,6,6-tetramethyl-4-piperidylstearate and a hexadecyl ester of 3,5-di-t-butyl-4-hydroxybenzoic acid into a high chroma thermoplastic polyolefin composition. According to various embodiments of the present teachings, the high chroma thermoplastic polyolefin composition has a chroma value ranging from between about 3 and about 25.

The method according to the present teachings can be applied to compositions including thermoplastic polyolefins chosen from the group consisting of polyethylene, polypropylene, and polybutylene.

The present method can be applied to, for instance, high chroma thermoplastic polyolefin compositions which further include a rubber component that is at least one element selected from the group consisting of polybutadiene, styrene-butadiene copolymer, acrylonitrile-butadiene copolymer, polyisoprene, ethylene-propylene diene terpolymer, ethylene-butene, and ethylene-propylene random copolymer.

According to various embodiments of the present teachings, the method can also be applied to high chroma thermoplastic polyolefin compositions which further include a colorant that is at least one element selected from the group consisting of carbon black, cobalt blue, napthol red, benzimidazole, ultramarine blue, titanium dioxide, phthalocyanine greens, phthalocyanine blues, ferrous/ferric oxide, ferric oxide, isoindolinones, dioxazines, bisdioxazines, and quinacridones. The colorants can be added to the composition in amounts ranging between about 0.5 wt. % to about 3 wt. %, or in amounts ranging between about 1.4 wt. % to about 1.9 wt. %, based on the overall weight of the composition.

The method can be utilized with compositions having 2-(2H-benzotriazol-2-yl)-4,6-di-t-pentylphenol present in an amount ranging from between about 0.1 wt. % to about 0.8 wt. %, or from between about 0.1 wt. % to about 0.4 wt. %, or from between about 0.4 wt. % to about 0.8 wt. %.

According to various embodiments of the present teachings, the method can be utilized with compositions having the mixture of 2,2,6,6-tetramethyl-4-piperidylstearate and a hexadecyl ester of 3,5-di-t-butyl-4-hydroxybenzoic acid present in an amount ranging from between about 0.2 wt. % to about 0.9 wt. %, or from between about 0.2 wt. % to about 0.6 wt. %, or from between about 0.5 wt. % to about 0.9 wt. %.

According to the present method, the high chroma thermoplastic polyolefin composition can have a chroma value of between about 3 and about 25, or between about 7 and about 15, or between about 9 and about 13.

The various embodiments of the present teachings can utilize various polyolefins, for instance, polyethylene, polypropylene, and polybutylene, at a range of concentrations including from about 58 to about 66 wt. %, or from about 60 to about 64 wt. %, or about 62 wt. % based on the total weight of the composition.

The various embodiments of the present teachings can utilize a variety of rubber components. Suitable rubber components include, for example and without limitation, polybutadiene, styrene-butadiene copolymer, acrylonitrile-butadiene copolymer, polymers of conjugated diene compounds such as polyisoprene, ethylene-propylene diene terpolymer, ethylene-butene, and ethylene-propylene random copolymer (ethylene-propylene rubber). The rubber component can be utilized at a range of concentrations including from about 26 to about 31 wt. %, or from about 27.5 to about 29.5 wt. %, or about 28.5 wt. % based on the total weight of the composition.

The various embodiments of the present teachings can include one or more colorants, such as dyes, organic pigments, inorganic pigments, and metallic flakes. The colorants can be added to the composition in amounts from about 0.5 wt. % up to about 3 wt. %, or in amounts ranging between about 1.4 wt. % to about 1.9 wt. %, based on the overall weight of the composition.

According to various embodiments of the present teachings, suitable colorants include the following pigments and pigment classes: dinitroanilines, anthanthrones, anthraquinones, anthrapyrimidines, mono-and diarylides, mono-, di-, and poly-azos, dioxazines, bisdioxazines, benzimidazole, flavanthrones, indanthrones, isoindolines, isoindolinones, indigos, naphthalimides, naphthols, quinacridones, quinophthalones, diketopyrrolopyrroles, isoviolanthrones, violanthrones, perinones, perylenes, phthalocyanine greens, phthalocyanine blues, porphyrins, pyranthrones, pyrazolones, rhodamines, terrylenes and quaterrylenes, thioindigos, toluidines, and xanthenes.

According to various embodiments of the present teachings, further suitable colorants include, inorganic pigments, for example, copper feffocyanide, ferrous/ferric oxide, ferric oxide, titanium dioxide, chrome titanate, titanium yellow, cobalt blue, ultramarine blue, copper chromite, molybdates, manganese ferrite, chromium hematite, cobalt-zinc aluminate, zinc oxide, carbon black, zinc sulfide, graphite, calcium carbonate, hydrated aluminum silicate, copper powder and the like.

Suitable flake pigments include bright aluminum flake, extremely fine aluminum flake, medium particle size aluminum flake, bright medium coarse aluminum flake, and mica flake coated with titanium dioxide pigment also known as pearl pigments.

The various embodiments of the present teachings can include, in a composition according to the present teachings, a mineral filler, which can be a treated or untreated inorganic material, such as talc, calcium carbonate, alumina trihydrates, ceramic fibers, metal fibers, polymeric fibers, kaolin, glass, silica, mica, and so forth. The mineral filler can be present in the composition in amounts ranging between about 6.5 wt. % to about 10.5 wt. %, based on the overall weight of the composition.

The above-described compositions can be prepared by blending or mixing together some or all of the components in separate mixing steps or in one step. The mixing can be carried out at any convenient temperature using methods and techniques employed in the art. The mixing may be done using methods and equipment known in the art, such as a Banbury mixer, a kneader, a monoaxial or biaxial extruder, and so forth.

Articles can be formed from the compositions according to the present teachings utilizing various known processes of forming thermoplastic materials. Examples of suitable processes include, without limitation, compression molding, extrusion, thermoforming, and injection molding.

A wide variety of articles can be formed from the compositions of the present teachings, for example, without limitation, automotive exterior body parts and moldings, such as trim strips, body side moldings, claddings, bumpers, skid garnishes, fascias, ground effects parts, door handles, mirror housing, full or partial body panels, doors, and front and rear deck lids.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXPERIMENTAL

The testing parameters for the various properties tested were as follows:

Izod Impact Strength—Molded test pieces were tested according to ASTM D256 to measure Izod impact strength.

Dupont Impact Strength—Molded test pieces were tested according to ASTM D638 to measure DuPont Impact strength.

Tensile Yield Strength—Molded test pieces were tested according to ASTM D638 to measure tensile yield strength.

Tensile Elongation at Break—Molded test pieces were tested according to ASTM D638 to measure tensile elongation at break.

Flexural Strength—Molded test pieces were tested according to ASTM D790 to measure flexural strength.

Flexural Modulus—Molded test pieces were tested according to ASTM D790 to measure flexural modulus.

Heat Deflection Temperature—Molded test pieces were tested according to ASTM D648 to measure heat deflection temperature.

Color Shift—Molded test pieces were evaluated according to ASTM E1164 after aging per JIS D0205.

Gloss Retention Rate—Molded test pieces were evaluated according to ASTM D2457 after aging per JIS D0205.

Comparison 1

A master batch of an automotive production standard thermoplastic polyolefin was prepared. Eight test samples were prepared utilizing the master batch. Half of the test samples were provided with a standard hindered amine light stabilizer, a mixture of bis(2,2,6,6-tetramethyl-4-piperidyl)sebacate and poly[[6-[(1,1,3,3-tetramethylbutyl)amino]-1,3,5-triazine-2,4-diyl][2,2,6,6-tetramethyl-4-piperidinyl)imino]-1,6-hexanediyl [(2,2,6,6-tetramethyl-4-piperidinyl)imino]]), at a 0.40 wt. % loading; the other half were provided with a hindered amine light stabilizer according to the present teachings, a mixture of 2,2,6,6-tetramethyl-4-piperidylstearate and a hexadecyl ester of 3,5-di-t-butyl-4-hydroxybenzoic acid, at a 0.40 wt. % loading. Colorants were then added to the samples to provide an un-colored system, a yellow system at 69.6 chroma, a green system at 28.4 chroma, and a blue system at 27.0 chroma.

The systems were then aged under carbon arc sunshine weatherometer conditions for 4000 hours. The aging method was based on the JIS D0205 method. All of the samples were tested for chalking after 500 hours, 1000 hours, 1500 hours, 2000 hours, 3000 hours, and 4000 hours.

Both of the un-colored system and the yellow system showed no chalking during the entire 4000 hours of aging. For the green system, the standard HALS formulation showed initial chalking after 1500 hours, and failed at 3000 hours, while the HALS formulation according to the present teachings, showed no chalking up to 3000 hours and failed after 4000 hours. For the blue system, the standard HALS formulation showed initial chalking after 1500 hours, and failed at 3000 hours, while the HALS formulation according to the present teachings, showed only initial chalking onset after 4000 hours.

Comparison 2

A grey-colored automotive production standard thermoplastic polyolefin composition with a chroma value of 1.01 typically utilized in bumper applications was prepared as a standard. The standard composition included 0.40 wt. % of a mixture of bis(2,2,6,6-tetramethyl-4-piperidyl)sebacate and poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]), as hindered amine light stabilizer. Two other compositions based on the standard composition but with different colorants, ultraviolet light absorber, and hindered amine light stabilizer components were also prepared as test samples of compositions according to the present teachings. Both test samples were blue in color with a chroma value of 9.5. Test sample A included 0.2 wt. % of 2-(2H-benzotriazol-2-yl)-4,6-di-t-pentylphenol, and 0.4% of a mixture of 2,2,6,6-tetramethyl-4-piperidylstearate and a hexadecyl ester of 3,5-di-t-butyl-4-hydroxybenzoic acid; test sample B included 0.6 wt. % of 2-(2H-benzotriazol-2-yl)-4,6-di-t-pentylphenol, and 0.7 wt. % of a mixture of 2,2,6,6-tetramethyl-4-piperidylstearate and a hexadecyl ester of 3,5-di-t-butyl-4-hydroxybenzoic acid.

All three compositions underwent testing of physical properties as set forth in Table 1. All three compositions fulfilled the engineering criteria for each of the tested physical properties.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

TABLE 1

| Item | | | Units | Criteria | Grey Standard | Sample A | Sample B |
|---|---|---|---|---|---|---|---|
| Izod Impact | | 23° C. | | No Break | NB | NB | NB |
| Strength | | −30° C. | | >59 | 76 | 97.1 | 87 |
| DuPont Impact | | 23° C. | J | >29.4 | >29.4 | >39 | >39 |
| | | −30° C. | | >29.4 | >29.4 | >39 | >39 |
| Tensile Yield Strength | | | MPa | >15.7 | 18.7 | 17.5 | 18.1 |
| Tensile Elongation at Break | | | % | >200 | 300% | 250% | 290% |
| Flexural Strength | | | MPa | >17.6 | 28 | 24.2 | 24.5 |
| Flexural Modulus | | | | >1470 | 1510 | 1510 | 1500 |
| Heat Deflection | 455 kPa | (4.6 kg/cm2) | ° C. | >100 | 104 | 100 | 101 |
| Temperature | 1820 kPa | (18.6 kg/cm2) | ° C. | — | — | — | — |
| Weatherability Carbon Arc 2,000 hrs | Tensile strength retention rate | | % | >80 | 106% | 99% | 102% |
| | Tensile elongation retention rate | | | | 95% | 85% | 86% |
| | Appearance | | visual | No changing No Fading | No changing No Fading | No changing No Fading | No changing No Fading |
| | DE | | Color meter | <3 | 0.8 | 1.6 | 1.6 |
| | Gloss retention rate | | Gloss meter | >80 | 89% | 81% | 90% |
| Long term heat stability Temp.: 100° C. Time: 2,000 hrs | Tensile strength retention rate | | % | >80 | 102% | 103% | 104% |
| | Tensile elongation retention rate | | | >80 | 95% | 86% | 88% |
| | Appearance | | Visual | No changing No Fading | No changing No Fading | No changing No Fading | No changing No Fading |

What we claim is:

1. A colored non-black composition comprising:
   about 58 to about 66 wt. % polypropylene;
   about 26 to about 31 wt. % rubber;
   about 6.5 to about 10.5 wt. % talc;
   about 0.5 to about 3 wt. % non-black organic colorant;
   about 0.1 to about 0.8 wt. % 2-(2H-benzotriazol-2-yl)-4,6-di-t-pentylphenol; and
   about 0.2 to about 0.9 wt. % of a mixture of 2,2,6,6-tetramethyl-4-piperidylstearate and a hexadecyl ester of 3,5-di-t-butyl-4-hydroxybenzoic acid,
   wherein the chroma value of the colored non-black composition is between about 3 and about 25, and the composition is non-black in color.

2. The colored non-black composition according to claim 1,
   wherein the rubber component comprises at least one element selected from the group consisting of polybutadiene, styrene-butadiene copolymer, acrylonitrile-butadiene copolymer, polyisoprene, ethylene-propylene diene terpolymer, ethylene-butene, and ethylene -propylene random copolymer.

3. The colored non-black composition according to claim 1,
   wherein the non-black organic colorant comprises at least one element selected from the group consisting of dinitroanilines, anthanthrones, anthraquinones, anthrapyrimidines, mono-and diarylides, mono-, di-, and poly-azos, dioxazines, bisdioxazines, benzimidazole, flavanthrones, indanthrones, isoindolines, isoindolinones, indigos, naphthalimides, naphthols, quinacridones, quinophthalones, diketopyrrolopyrroles, isoviolanthrones, violanthrones, perinones, perylenes, phthalocyanine greens, phthalocyanine blues, porphyrins, pyranthrones, pyrazolones, rhodamines, terrylenes and quaterrylenes, thioindigos, toluidines, and xanthenes.

4. The colored non-black composition according to claim 1,
   wherein the non-black organic colorant comprises at least one element selected from the group consisting of napthol red, benzimidazole, phthalocyanine greens, phthalocyanine blues, isoindolinones, dioxazines, bisdioxazines, and quinacridones.

5. The colored non-black composition according to claim 1, wherein the composition further comprises metallic flake.

6. The colored non-black composition according to claim 1,
   wherein 2-(2H-benzotriazol-2-yl)-4,6-di-t-pentylphenol is present in an amount ranging from between about 0.1 wt. % to about 0.4 wt. %.

7. The colored non-black composition according to claim 1,
   wherein 2-(2H-benzotriazol-2-yl)-4,6-di-t-pentylphenol is present in an amount ranging from between about 0.4 wt. % to about 0.8 wt. %.

8. The colored non-black composition according to claim 1,
   wherein the mixture of 2,2,6,6-tetramethyl-4-piperidylstearate and a hexadecyl ester of 3,5-di-t-butyl-4-hydroxybenzoic acid is present in an amount ranging from between about 0.2 wt. % to about 0.6 wt. %.

9. The colored non-black composition according to claim 1,
   wherein the mixture of 2,2,6,6-tetramethyl-4-piperidylstearate and a hexadecyl ester of 3,5-di-t-butyl-4-hydroxybenzoic acid is present in an amount ranging from between about 0.5 wt. % to about 0.9 wt. %.

10. The colored non-black composition according to claim 1,
    wherein the colored non-black composition has a chroma value of between about 7 and about 15.

11. The colored non-black composition according to claim 1,
    wherein the colored non-black composition has a chroma value of between about 9 and about 13.

12. A method of increasing the weatherability of a high chroma thermoplastic polyolefin colored non-black composition comprising:
    incorporating about 0.1 to about 0.8 wt. % 2-(2H-benzotriazol-2-yl)-4,6-di-t-pentylphenol, and about 0.2 to about 0.9 wt. % of a mixture of 2,2,6,6-tetramethyl-4-piperidylstearate and a hexadecyl ester of 3,5-di-t-butyl-4-hydroxybenzoic acid into a high chroma thermoplastic polyolefin colored non-black composition which comprises at least 58 wt. % thermoplastic polyolefin;

about 58 to about 66 wt. % polypropylene;

about 26 to about 31 wt. % rubber;

about 6.5 to about 10.5 wt. % talc;

about 0.5 to about 3 wt. % non-black organic colorant wherein the high chroma thermoplastic polyolefin colored non-black composition has a chroma value ranging from between about 3 and about 25, and further comprises an organic colorant.

13. The method according to claim 12, wherein the high chroma thermoplastic polyolefin colored non-black composition further comprises a rubber component that is at least one element selected from the group consisting of polybutadiene, styrene-butadiene copolymer, acrylonitrile-butadiene copolymer, polyisoprene, ethylene-propylene diene terpolymer, ethylene-butene, and ethylene-propylene random copolymer.

14. The method according to claim 12, wherein the organic colorant comprises a colorant that is at least one element selected from the group consisting of napthol red, benzimidazole, phthalocyanine greens, phthalocyanine blues, isoindolinones, dioxazines, bis-dioxazines, and quinacridones.

15. The method according to claim 12, wherein 2-(2H-benzotriazol-2-yl)-4,6-di-t-pentylphenol is present in an amount ranging from between about 0.1 wt. % to about 0.4 wt. %.

16. The method according to claim 12, wherein 2-(2H-benzotriazol-2-yl)-4,6-di-t-pentylphenol is present in an amount ranging from between about 0.4 wt. % to about 0.8 wt. %.

17. The method according to claim 12, wherein the mixture of 2,2,6,6-tetramethyl-4-piperidyl-stearate and a hexadecyl ester of 3,5-di-t-butyl-4-hydroxybenzoic acid is present in an amount ranging from between about 0.2 wt. % to about 0.6 wt. %.

18. The method according to claim 12, wherein the mixture of 2,2,6,6-tetramethyl-4-piperidyl-stearate and a hexadecyl ester of 3,5-di-t-butyl-4-hydroxybenzoic acid is present in an amount ranging from between about 0.5 wt. % to about 0.9 wt. %.

19. The method according to claim 12, wherein the colored non-black composition has a chroma value of between about 7 and about 15.

20. The method according to claim 12, wherein the colored non-black composition has a chroma value of between about 9 and about 13.

* * * * *